United States Patent [19]

Wildman et al.

[11] 4,020,631
[45] May 3, 1977

[54] LINK FOR PINTLE CHAIN

[75] Inventors: Claude L. Wildman, Thomson, Ill.;
George A. Hellmer, Maquoketa, Iowa

[73] Assignees: Richard A. Kummerer; Alfred Den Besten, both of Fulton, Ill. ; part interest to each

[22] Filed: July 8, 1975

[21] Appl. No.: 594,190

Related U.S. Application Data

[63] Continuation of Ser. No. 457,801, April 4, 1974, abandoned.

[52] U.S. Cl. .................................................. 59/90
[51] Int. Cl.² .......................................... F16G 15/12
[58] Field of Search .................. 59/90, 91, 84, 5, 6, 59/8, 13, 14, 15, 35; 74/250 R, 250 C, 245 R, 245 C, 248, 251, 255; 198/189

[56] References Cited

UNITED STATES PATENTS

| | | | |
|---|---|---|---|
| 2,272,837 | 2/1942 | Getz | 74/250 R |
| 2,938,329 | 5/1960 | Onulak | 59/8 |
| 2,968,913 | 1/1961 | Onulak | 59/6 |
| 3,054,301 | 9/1962 | Kummerer | 74/250 R |
| 3,153,897 | 10/1964 | Kummerer | 59/8 |
| 3,221,490 | 12/1965 | Onulak | 59/13 |
| 3,359,814 | 12/1967 | Kummerer | 74/245 R |
| 3,596,527 | 8/1971 | Besten | 74/229 |

FOREIGN PATENTS OR APPLICATIONS 372,243  11/1963  Switzerland ............................ 59/90

*Primary Examiner*—C.W. Lanham
*Assistant Examiner*—Gene P. Crosby

[57] ABSTRACT

A pintle chain link composed of a singular rigid U-shaped link member with opposite sides and an arcuate-shaped crosspiece adjoining the sides. The sides have their open ends offset from the closed ends so that the latter may fit between the former of adjacent links. The sections of the sides at the closed ends also are tapered from a relatively thick part adjoining the crosspiece to a relatively narrow part adjoining the remainder of the sides. The arcuate-shaped crosspiece is also made thicker than the sides by compressing excess material into the crosspiece.

15 Claims, 11 Drawing Figures

LINK FOR PINTLE CHAIN

This is a continuation of application Ser. No. 457,801, filed April 4, 1974 now abandoned.

BACKGROUND OF THE INVENTION

It has heretofore been known to provide U-shaped pintle links formed of a singular strap. Conventionally, the strap has first been formed into a complete U-shaped member by stretching it around a die. Previous to forming it in the U-shaped member, pin openings were cut at the ends and adjacent the center. When stretching the strap into the U-shaped member, the portions of the link around the openings stretched and generally caused the openings to elongate. This created weak areas in the link around the openings. Also, when forming the strap into the U-shaped member, the corners of the link were stretched and this further caused a weak point in the link which often caused premature failures. Further, by so stretching the strap when forming the link into the U-shaped member, the grain of the strap became aligned generally lengthwise of the strap. This alignment of the grain in the strap also was a cause of early failure in the chain links.

SUMMARY OF THE INVENTION

With the above in mind, it is the primary object of the present invention to provide a U-shaped link in which when forming the single strap into a U-shaped member the closed end is substantially semi-circular with excess material being provided. Dies are provided with wide cavities for forming the side sections adjacent the closed end of the U-shaped member. The arcuate-shaped end is formed by compacting or compressing the semicircular end into the arcuate-shaped end and forcing material into the wider cavities. Also, additional material is compressed into the crosspiece and the corners. Thus, the present link will have a thicker section in its sides adjacent a closed end of the loop and around the openings; it will have a thicker arcuate-shaped crosspiece; and its corners will be thicker. Further, by compressing the material as is done in the present invention, the grain will become more homogeneous at the closed end of the U-shaped member and additionally strengthen the link.

DESCRIPTION OF THE PREFERRED EMBODIMENT

Figure 1:
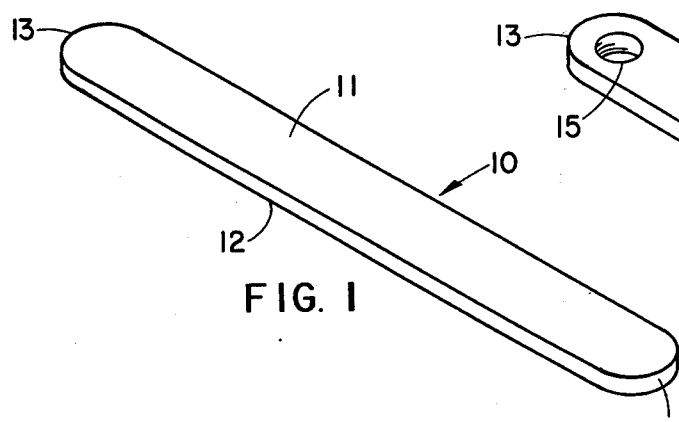
FIG. 1 is a perspective view of a metal strap that is used in forming a chain link.
Figure 2:
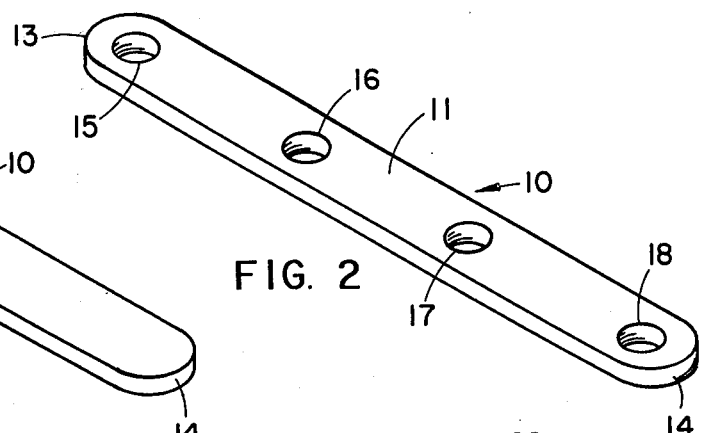
FIG. 2 is a perspective view of the same strap shown with the pin holes punched therein.

The manner in which the links of the present invention is formed into chains is generally described in U.S. Pats. Nos. 3,153,897; 3,054,301; 3,359,814 and 3,596,527. Consequently, the present invention generally relates to improved links and the method of constructing the improved links. Reference may, however, be made to those patents showing the details of the means of connecting the links and to the connecting pins.

Referring now to FIGS. 1–4, the link is formed from an elongated steel strap 10 that has opposite surfaces 11, 12. It is rounded at its ends 13, 14. The strap 10 is first placed in a jig, as is shown in FIG. 5, and pin-receiving openings 15, 16, 17, and 18 are pierced through the strap. Openings 15, 18 are adjacent the ends 13, 14, and openings 16, 17 are centrally located with each being offset equidistance from the midlength of the strap 10.

Figure 3:
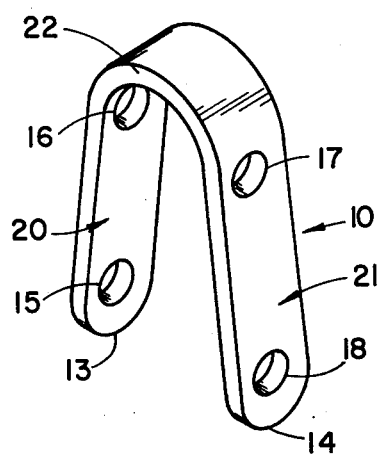
FIG. 3 is a perspective view of the strap as shown in FIG. 2 formed in a U- or V-shape.
Figure 6:
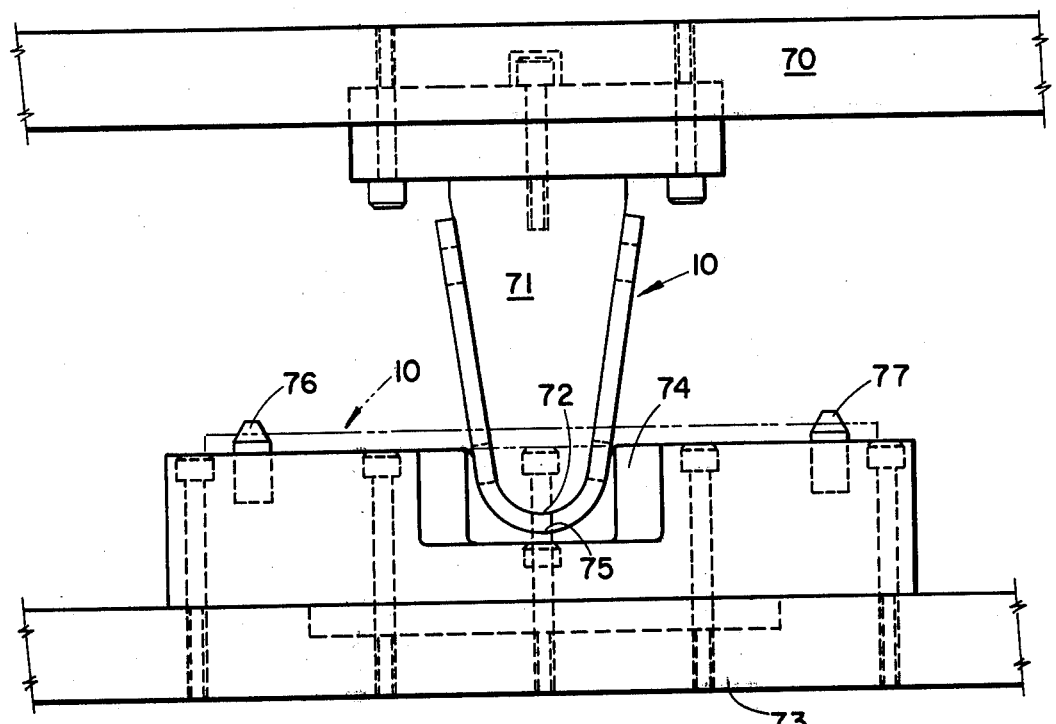
FIG. 6 is a view similar to FIG. 5 but showing the die required to form the strap as shown in FIG. 3.

Following the piercing of the holes 15, 16, 17, and 18, the strap 10 is placed in a fixture as shown in FIG. 6 and the strap 10 is formed into a U- or V-shaped, as shown in FIG. 3. The V-shaped member has opposite sides 20, 21 joined by a semi-circular or looped end 22. The openings 16, 17 are transversely aligned across the link and the openings 15, 18 are similarly aligned.

Figure 4:
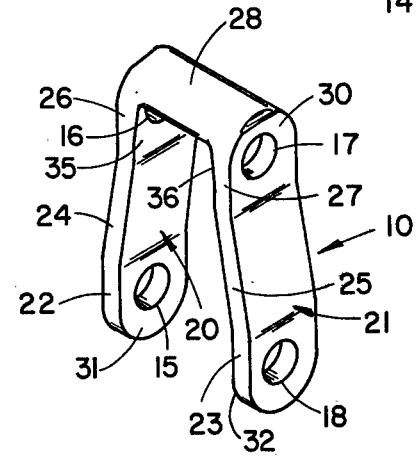
FIG. 4 is a perspective view of the chain link after the final step in forming the link from the member shown in FIG. 3 has occurred.
Figure 5:
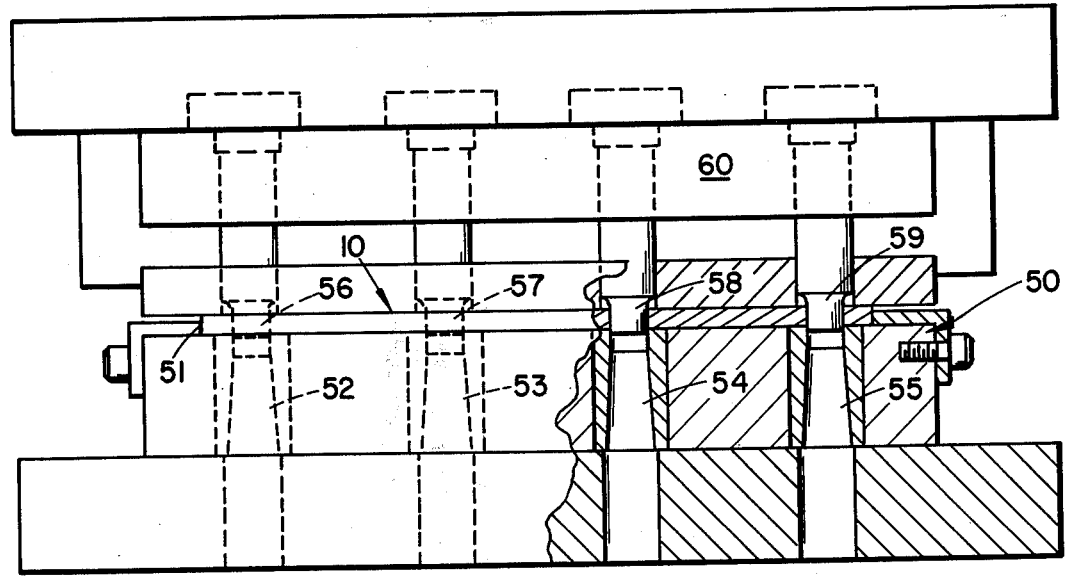
FIG. 5 is a side view, partially in section, showing the die and the strap as the holes are being pierced so that the strap will appear as is shown in FIG. 2.
Figure 10:
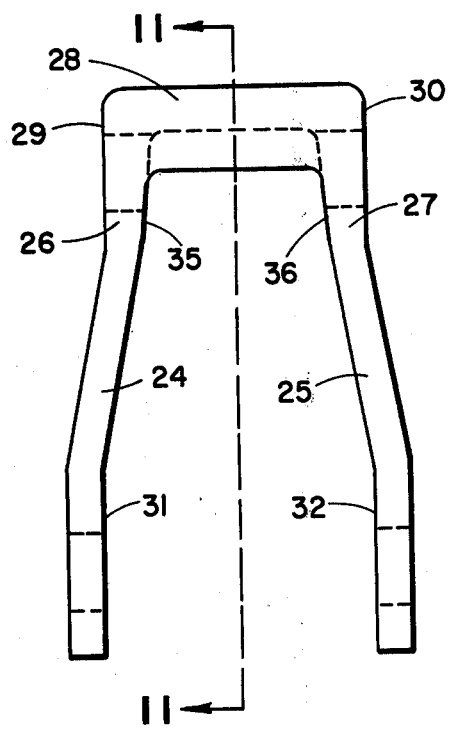
FIG. 10 is a plan view of the link as shown in FIG. 4.
Figure 11:
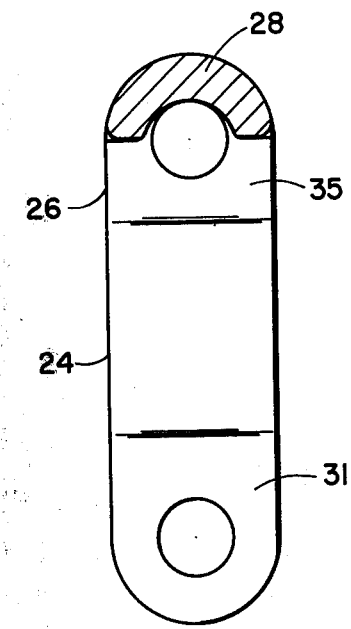
FIG. 11 is a sectional view taken along the line 11—11 of FIG. 10.
Figure 7:
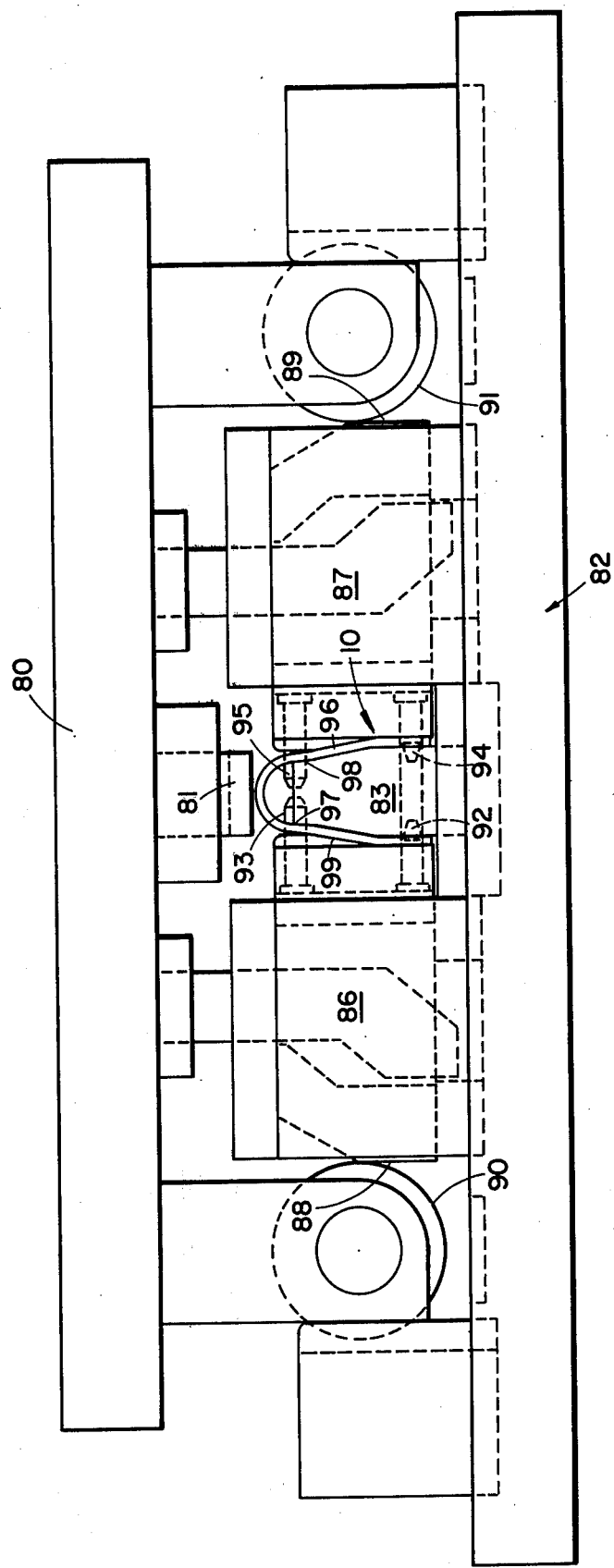
FIG. 7 is a view similar to FIG. 6 showing a further die and fixture for forming the first part of the link as shown in FIG. 4.
Figure 8:
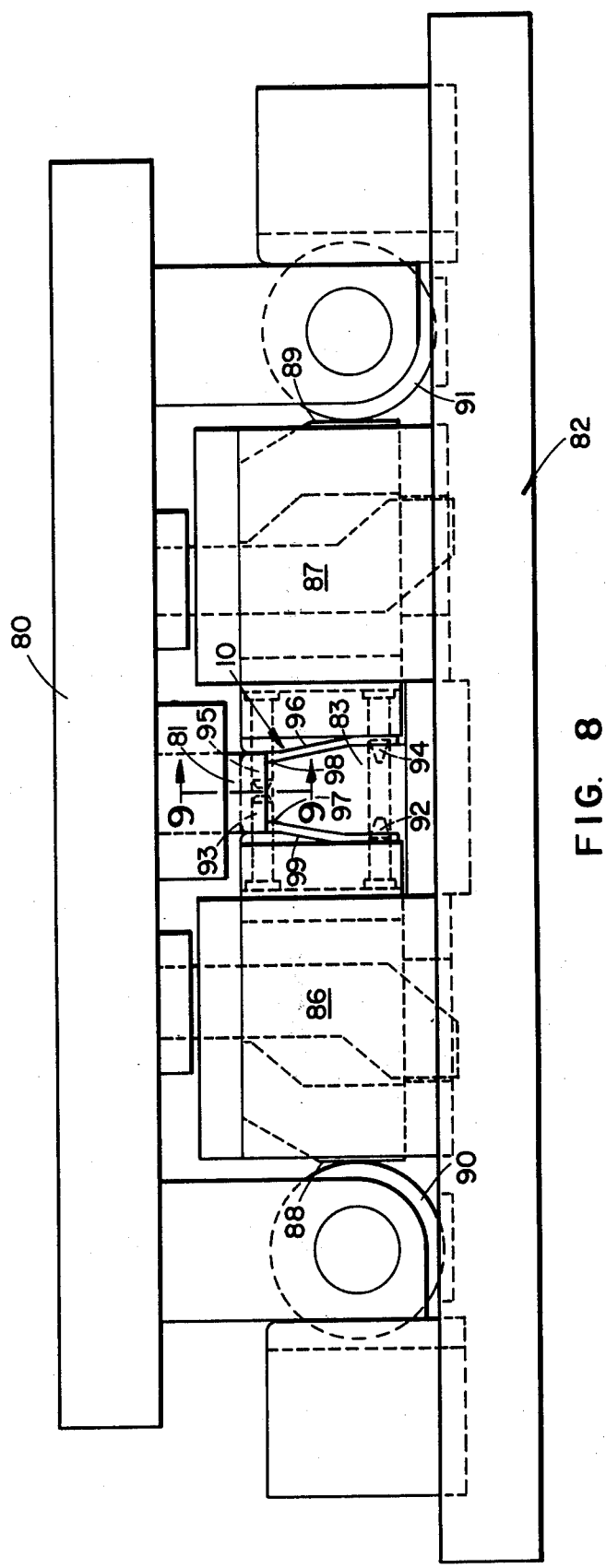
FIG. 8 is a view identical to FIG. 7 but showing the final step in forming the strap shown in FIG. 4.
Figure 9:
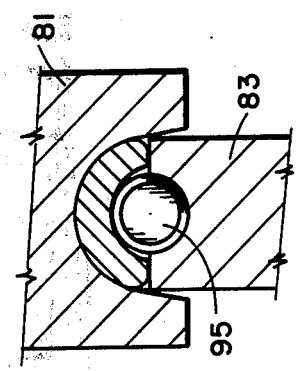
FIG. 9 is an enlarged sectional view as taken along the line 9—9 of FIG. 8.

The link, as shown in FIG. 3, is then placed in a die or fixture shown in FIGS. 7–9 and the final forming or shaping of the link, as shown in FIG. 4 occurs. The link, as shown in FIGS. 4, 10 and 11 has sides 20, 21 with end sections 22, 23 at the free or open end of the link, continuing inwardly diverging midsections 24, 25 that extend from the section 22, 23 inwardly to join with opposite end sections 26, 27 that join with an arcuate-shaped crosspiece 28 formed from the previous semi-circular loop 22. The crosspiece 28 is arcuate-shaped so that a pin extending through the openings 16, 17 will bear against the inner surface thereof. The final link, as shown in FIG. 4, has its free end sections 22, 23 outwardly offset with respect to the end sections 26, 27 and generally so that the outer surfaces 29, 30 are offset inwardly from the inner surfaces 31, 32 of the sections 22, 23. The surfaces 29, 30 are generally parallel and normally fit inside of the surfaces 31, 32 of an adjacent link in a chain. As is clearly apparent from viewing the previously referred to patents, pins are normally provided that extend through the openings 15, 18 and the openings 16, 17 of adjacent links.

Inner surfaces 35, 36 of the sections 26, 27 converge inwardly with respect to the outer surfaces 29, 30 from their point of juncture with the midsections 24, 25 to their point of juncture with the crosspiece 28. It should therefore be understood that due to the construction or forming of the present link, material is packed in the upper section of the link so that in the normal areas of the link where stress may occur, the respective portions of the link is substantially thicker than the remainder of the link. This is particularly true at the corner sections between the crosspiece 28 and the sections 26, 27. Reviewing FIG. 10, it will be noted that the corner thickness is substantially greater than the thickness of the midsections 24, 25 or the end sections 31, 32. Also, around the openings 16, 17, thickness of the link is increased. Thus, at the points of normal failure of links, the present link has additional strength built in.

Referring now to FIG. 5, the die tool utilized in the piercing or making of the holes 15–18 is composed of a basic fixture having an upper recessed surface 51 that may receive the metal strap in the form shown in FIG. 1. The base of the fixture 50 is provided with openings 52, 53, 54, and 55 through which the slugs from the openings or holes 15–18 may drop. The upper ends of the openings 52–55 receive the lower ends of piercing or hole-punching tools 56, 57, 58, and 59 that cut through and form the openings 15–18. The tools 56–59 are carried by an upper tool carrier 60 that is suitably powered to force the tools 56–59 downwardly to form the respective openings, the exact type of power and the means of providing the power not being shown since such may be conventional and any of a multitude of kinds used in such work.

Following forming of the openings shown in FIG. 5, the link is transferred to a fixture as shown in FIG. 6. The die or fixture shown in FIG. 6 is composed of upper portions 70 that rigidly carries a rigid male die 71 having a lower nose end 72 that is rounded. A lower portion 73 of the fixture carries a female die portion 74 that is aligned with and has a substantially semicircular opening 75. Outboard and equally spaced from the fixture 74 are a pair of pilot lugs 76, 77 that are the same size as and are received in the openings 15, 18 of a metal strap 10 as shown. Again suitable power means are provided between the upper portion 70 of the fixture and the lower portion 73 of the fixture to force the fixtures together and to separate them when necessary.

In operation the die shown in FIG. 6 operates as follows: The strap 10 leaving the fixture of FIG. 5 is placed on the lower fixture bed 73 so that the pilot lugs 76, 77 are received or sit in the openings 15, 18. In this location, the strap 10 is properly positioned. The die 71 is then lowered to force the strap 10 into its U- or V-shaped form as shown in FIGS. 3 and 6. Upon raising the upper fixture 70, the link 10 may be removed.

The V-shaped link 10 is then moved into the die shown in FIGS. 7, 8 and 9. The die or fixture shown is composed of an upper fixed portion 80 having a depending female die 81. The fixture also includes a vertically-movable lower section 82 that carries a male die 83. The lower fixture 82 also carries a pair of horizontally-shiftable die members 86, 87 that fit on opposite sides of the die 83. The outer ends of the die members 86, 87 have cam edges 88, 89 that bear against rollers 90, 91. The inner portions of the members 86, 87 carry pilot pins 92, 93 and 94, 95, respectively, that are recieved in openings 15, 16 and 18, 17, respectively. Again, power means for forcing the entire die fixture 82 upwardly is provided although not shown in detail. Any type of conventional power may be used to provide such shifting.

Referring first to FIG. 7, the U- or V-shaped member link removed from the die as shown in FIG. 6 is placed in a position on the die of the fixture shown in FIGS. 7–9. The pilots 92–95 are first inserted into the openings 15–18 and the entire fixture 82 then raised so that the cam surfaces or edges 88, 89 engage the rollers 90, 91, thereby forcing the members 86, 87 inwardly. Opposite outer surfaces of the male die 83 is shaped to form the inner surfaces of the sides of the link. Complementary surfaces 95, 96 are provided on the inner ends of the die members 86, 87 and cooperate therewith to shape the offset and end sections 22, 23 and 26, 27 of the link. This, of course, leaves the upper looped end 22 still intact, such being shown in FIG. 7. It should here, however, be noted that due to the operation of the dies 86, 87 the sides of the link being formed is tightly gripped prior to and during the forming of the upper crosspiece. Referring now to FIG. 8, the fixture 82 is continued upwardly until the upper semicircular or looped end 22 of the link engages the female underside of the die 81. Since there is an excess of material in the section 22, as the fixture 82 continues upwardly it forces material down into the top of the link thereby making a crosspiece thicker than the remainder of the link. Also, it should here be noted that the upper section of the male die 83 is tapered as at 97 and 98. The tapered sides 97, 98 of the upper portion of the male die 83 form tapered openings with their opposite counterpart surfaces of die members 86, 87. Consequently, as material is forced from the loop or semi-circular end 22 downwardly it is forced also into the openings formed by the tapered surfaces 97, 98. This material will then wedge itself in the die so that the additional material being forced down will be resisted by this wedging action. This wedging action prevents distortion of the openings 15–18 which might otherwise remain due to the enormous pressure between the fixtures 80, 82. Also, since the pilot pins 92–95 fix the openings 15–18, exact pitch of each link is maintained during the die-forming operation.

While not shown, suitable means are provided for separating the die blocks 86, 87 and the sections 80, 82 so that the link may be removed. It should also be recognized the various dies shown in FIGS. 5–8 may be placed on a machine so that the links are formed continuously without removal from the machine.

By compressing the head 28 and the side sections 26, 27 as described forces realignment of the grain in the strap 10. Thus, while the forming of the chain links as described in the aforementioned patents caused the grain therein to run lengthwise and somewhat weaken the links, the present method of forming the links causes the grain to become more homogenous and thus strengthen the link.

We claim:

1. A pintle link for a pintle chain comprising: a U-shaped link composed of a pair of sides with free end sections at its open end, opposite end sections at its closed end, and inwardly converging sections joining with and extending between the free end sections and the opposite end sections, said free end sections and converging sections being of uniform thickness, said opposite end sections being thicker beginning adjacent their junction with the converging sections; each of said end sections having a pin opening therein in alignment with an opening in its respective counterpart end section on the opposite side and a crosspiece at the closed end of the link integral with and joining said opposite end sections.

2. The invention defined in claim 1 in which the crosspiece is arcuate-shaped and is substantially thicker than the free end sections and converging sections.

3. The invention defined in claim 1 in which the end sections adjacent the crosspiece has outer surfaces substantially parallel to one another and inner surfaces that diverge with respect to their respective outer surfaces beginning at said junctures and extending to the crosspiece.

4. The invention defined in claim 1 in which said opposite end sections and said crosspiece join to define opposite corners and the thicknesses of said corners are greater than the thickness of the crosspiece and said opposite end sections.

5. A pintle chain link formed form a metal strap comprising: a singular rigid U-shaped link having an open end and a closed end and opposite sides extending between the ends and interconnected at said closed end by an arcuate-shaped crosspiece, said sides having end portions adjacent the respective open and closed ends with the end portions at said open end being offset outwardly with respect to the end portions at said closed end so that the former end portions may lie adjacent to but outside the latter end portions of an adjoining link, each of said end portions having aligned pin-receiving openings, and each of said end portions having inner and outer surfaces with the outer surfaces of the end portions adjacent said closed end being substantially parallel to the inner surfaces of the end portions adjacent said open end; and said inner surfaces of the end portions adjacent said closed end converging toward one another and diverging with respect to their respective outer surfaces as they approach the crosspiece so that adjacent to and at their junctures with the crosspiece and at the openings at said closed end of the sides are substantially thicker in comparison with the other portions thereof.

6. An open end pintle link chain composed of a singular U-shaped member having a crosspiece rigidly joining two side portions; said side portions beginning with opposite parallel end sections at the open end and continuing therefrom toward the crosspiece with diagonally inwardly extending sections and from thence to end sections adjacent to and joining with said crosspiece, the latter end sections being thicker at the juncture with said crosspiece than at the juncture with said inwardly extending sections, and the latter end sections being inwardly offset with respect to the end sections at the open end so that the end sections of one link may fit alongside the opposite end sections of an adjacent link; said sides further having pin-receiving openings in their end sections for receiving pins; and said crosspiece having a thickness greater than the thickness of the side sections except at the end sections adjacent the crosspiece.

7. The invention defined in claim 6 characterized by the side portions having inner and outer surfaces with the inner surfaces of the end sections adjacent the crosspiece diverging away from their respective outer surfaces beginning at the juncture with the diagonal sections and ending at their junctures with the crosspiece.

8. The invention defined in claim 6 in which the junctures between the crosspiece and end sections form the corners of the U-shaped link, and the thickness of the link at the corners is greater than the thickness of the sides and crosspiece.

9. A pintle link comrpising: a singular U-shaped link member having opposite sides with aligned pin openings extending through end portions adjacent the open end of the member and through end portions adjacent the closed end of the member, an integral crosspiece adjoining and forming corners with the sides at the closed end of the member, said crosspiece having an inner surface facing the open end, said inner surface adapted to bear against a pin extending through the openings at the closed end, the portions of said links forming the corners and adjacent the openings at the closed end being thicker than the end portions at the open end of the member.

10. The invention defined in claim 9 characterized by the end portions at the closed end being inwardly offset from the end portions at the open end so that the latter end portions may be placed alongside and outwardly of the former of an adjacent link in the chain.

11. The invention defined in claim 10 in which the two end portions at the closed end are tapered and formed by outer surfaces substantially parallel to one another and inner surfaces that diverge away from the outer surfaces as they near the crosspiece.

12. The invention defined in claim 9 further characterized by the crosspiece being thicker than the end portions adjacent the open end of the member.

13. The invention defined in claim 12 in which the end portions at the closed end join the crosspiece at corners and the largest thickness dimension of said corners is substantially greater than the thickness of said crosspiece and of said sides.

14. In a U-shaped pintle link having opposite sides extending from an integral crosspiece and formed from an elongated metal strap by bending the sides from the crosspiece to form corners with the crosspiece, and in which aligned pin openings are provided in the sides at the link's closed end and at its open end, the improvement residing in said corners and the portions of the sides adjacent the openings at the closed end of the U-shaped link being thicker than the thickness of the remaining portions of the sides to thereby strengthen the link at the corners and adjacent the openings at the closed end.

15. The invention defined in claim 14 further characterized by the thickness of the crosspiece being thicker than said remaining portions of the sides.

* * * * *